UNITED STATES PATENT OFFICE.

RUDOLPH BERENDES AND JÜRGEN CALLSEN, OF ELBERFELD, GERMANY, ASSIGNORS TO FARBENFABRIKEN VORM. FRIEDR. BAYER & CO., OF ELBERFELD, GERMANY, A CORPORATION OF GERMANY.

SUCCINYL-DIOXYTOLUIC ACID.

No. 874,928.  Specification of Letters Patent.  Patented Dec. 31, 1907.

Application filed July 22, 1907. Serial No. 385,045. (Specimens.)

*To all whom it may concern:*

Be it known that we, RUDOLPH BERENDES and JÜRGEN CALLSEN, doctors of philosophy, chemists, citizens of the German Empire, residing at Elberfeld, Kingdom of Prussia, Germany, have invented new and useful Improvements in Succinyl-Dioxytoluic Acids, of which the following is a specification.

Our invention relates to the preparation of the hitherto unknown succinyl-di-oxytoluic acids having the formula:

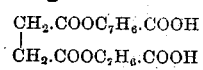

which can be prepared by treating oxytoluic acids (cresotinic acids) or its salts with the acid dihalogenids of succinic acid. According to our researches these products are valuable therapeutic compounds. They are suitable for use as substitutes for salicylic acid, an average dose being about one gram.

The new products are crystalline compounds being decomposed into succinic acid and oxytoluic acid by heating them with caustic alkalies, being soluble in alcohol and acetone and being scarcely soluble in water.

In order to illustrate our invention we give the following example, the parts being by weight: 155 parts of succinyl chlorid are slowly added to a solution of 304 parts of para-oxytoluic acid

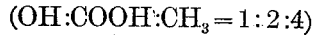

in 500 parts of benzene and 300 parts of dimethylanilin. The addition of the succinyl chlorid is best carried out at a temperature of about 20° C. The mixture is allowed to stand for some hours. It is then poured into water and an excess of HCl is added thereto. The succinyl-di-paraoxytoluic acid separates on stirring for a short time as a solid body, its precipitation is accelerated by the addition of ligroin. It is filtered off, washed with water and recrystallized from glacial acetic acid or alcohol. The new compound forms a crystalline powder melting at about 193–195° C. It is odorless and almost tasteless, soluble in hot alcohol and glacial acetic acid and scarcely soluble in water. On boiling the succinyl-di-paraoxytoluic acid with water or with alkalies it is decomposed, succinic acid and para-oxytoluic acid being formed.

The following equation illustrates the reaction which takes place:

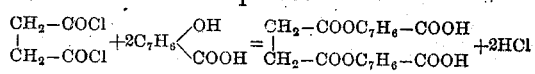

The succinyl-di-ortho-oxytoluic acid obtainable from ortho-oxytoluic acid $$(OH:COOH:CH_3 = 1:2:6)$$

melts at 163–164° C. It is a crystalline tasteless powder. The succinyl-di-meta-oxytoluic acid obtainable from meta-oxytoluic acid

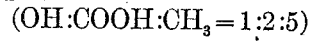

melts at 195–197° C.

The new succinyl oxytoluic acids possess the property of forming salts with many metals, for example: the alkaline metals; the hydrogen of the carboxyl groups being replaced by the metal. In this manner either neutral or acid salts may be obtained. The new acids may also form salts with organic bases, such as: hexamethylentetramin. These salts represent the usual addition products of 1 molecule of the acid and 1 or 2 molecules of the base. All these salts have substantially the same therapeutic effect.

Having now described our invention and in what manner the same is to be performed, what we claim as new and desire to secure by Letters Patent is:—

1. The herein-described new succinyl-di-oxytoluic acids obtainable by the action of the acid dichlorid of succinic acid upon oxytoluic acids, which in the acid form are white crystalline powders soluble in alcohol and acetone, scarcely soluble in water and which by heating with caustic alkalies are decomposed into succinic acid and oxytoluic acids, forming salts with bases which retain the valuable therapeutic properties exhibited by the acids, substantially as hereinbefore described.

2. The herein-described new succinyl-di-paraoxytoluic acid obtainable by the action of the acid dichlorid of succinic acid upon para-oxytoluic acid, which in the acid form is a white crystalline powder melting at 193°–195° C., soluble in hot alcohol and glacial acetic acid, scarcely soluble in water and which by heating with caustic alkalies is decomposed into succinic acid and para-oxytoluic acid, forming salts with bases
5 which retain the valuable therapeutic properties exhibited by the acid, substantially as hereinbefore described.

In testimony whereof we have hereunto set our hands in the presence of two subscribing witnesses.

RUDOLPH BERENDES. [L. S.]
 JÜRGEN CALLSEN. [L. S.]

Witnesses:
 OTTO KÖNIG,
 OSKAR KLUG.